Patented May 5, 1931

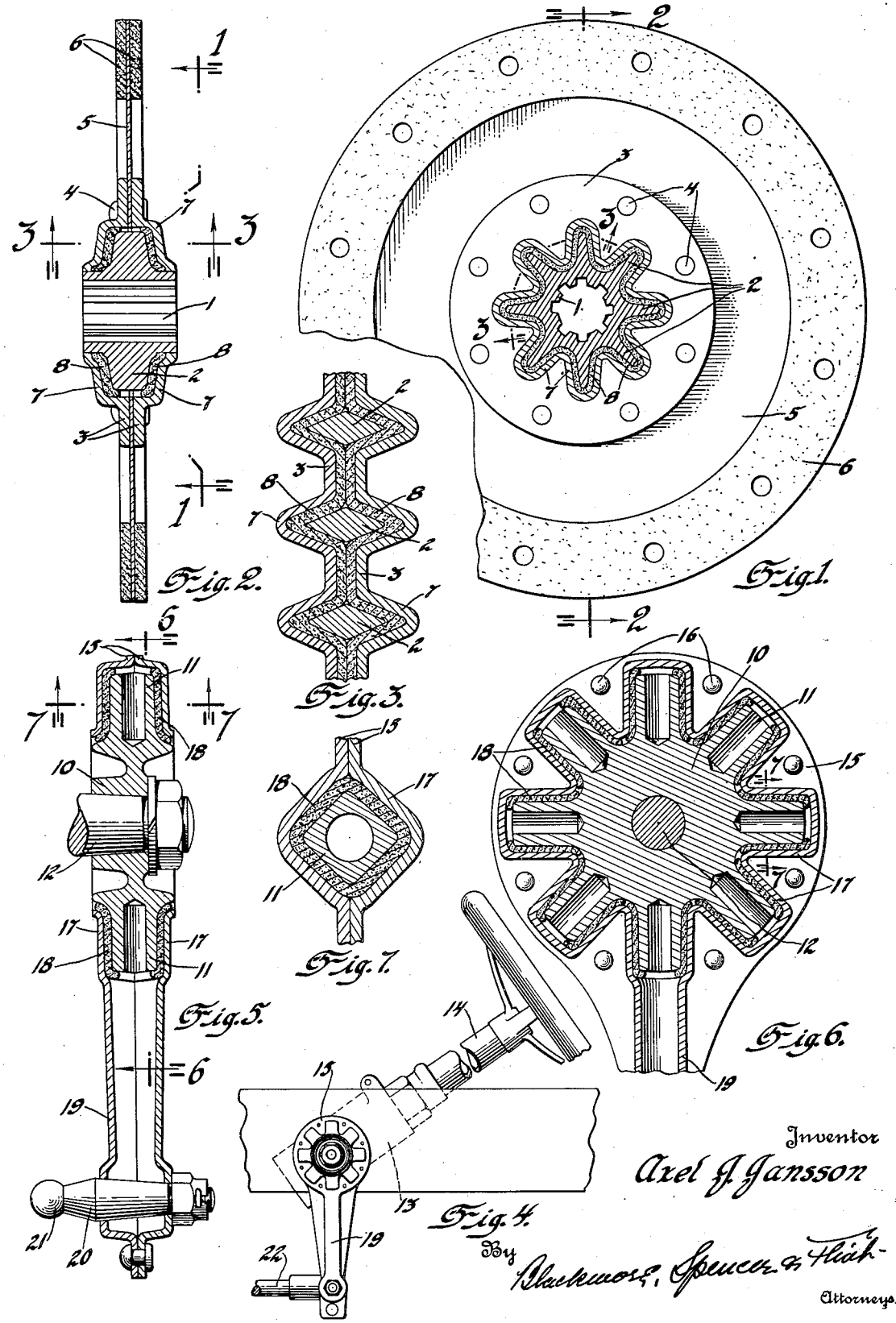

1,803,937

UNITED STATES PATENT OFFICE

AXEL J. JANSSON, OF FLINT, MICHIGAN, ASSIGNOR TO GENERAL MOTORS CORPORATION, OF DETROIT, MICHIGAN, A CORPORATION OF DELAWARE

CUSHION CONNECTION

Application filed January 30, 1929. Serial No. 336,150.

This invention relates to shock absorbers and more particularly to an improvement in cushion connections, and in its preferred embodiment the invention is especially adapted for use as a motion transmitting device and consists of two parts which are provided with interlocking portions between which is interposed a suitable cushion to damp out the inertia shocks incident to sudden starting and stopping, rapid acceleration or deceleration, as well as violent reactionary forces, vibration and the like, whereby strains, wear, and breakage are materially reduced or entirely eliminated.

Among other things, the invention aims to provide a practical device for effectually absorbing shock which is made up of a few simple and economically manufactured parts that are easily and quickly assembled for use and which is unlikely to get out of order.

The invention will be better understood upon reference to the accompanying drawings wherein Fig. 1 is a sectional view taken on line 1—1 of Fig. 2, and illustrates the invention embodied in a friction disc forming a part of a conventional clutch in common use on motor vehicles. Fig. 2 is a transverse sectional view taken on line 2—2 of Fig. 1. Fig. 3 is a sectional view taken on line 3—3 of Fig. 2. Fig. 4 is a fragmentary side elevation of a portion of the steering mechanism of an automobile in which the present invention is embodied in form slightly different from that shown in Fig. 1. Fig. 5 is a transverse sectional view of the pitman steering arm shown in Fig. 4. Fig. 6 is a vertical sectional view taken on line 6—6 of Fig. 5, and Fig. 7 is a sectional view taken on line 7—7 of Fig. 5.

Referring to the drawings, the reference character 1 indicates an inner member or hub which is splined for sliding engagement on a drive shaft and carries a series of radial projections or lugs 2, of diamond shape in section, as best illustrated in Fig. 3. A pair of plates or annular rings 3—3 located on opposite sides of the member 1, are secured face to face by bolts or rivets 4 and hold between them the clutch disc 5 carrying friction rings 6 on opposite sides at the peripheral edges. Each plate 3 is provided with a series of depressed portions 7 corresponding in number to the lugs or projections 2 and which cooperate or are matched one with another to provide open spaces into which the projections 2 extend. The adjacent surfaces of the projections 2 and depressed portions 7 are spaced a slight distance from each other and filling the space between these adjacent surfaces, are inserts 8 of rubber or other similar substance of elastic deformable character. In this case the rubber cushion is in the form of two strips or rings one on each side of the series of the lugs or between the sides of the lugs and the depressed portions of the respective plates 3—3. In the assembly of the parts, the rubber material is preferably placed under an initial degree of pressure to eliminate its excessive responsiveness to deformation, and to prolong its life or period of usefulness. The rubber insert between the cooperating inclined surfaces of the projections 2 and depressed portions 7 by its deformation, serves to cushion torque reactions and the various stresses incident to clutching and declutching operations and variations in the running speed of the automobile.

In the alternative form of the invention, the inner member or hub 10 having the radial projections or lugs 11, is keyed or splined on the shaft 12 extending laterally from the housing 13, enclosing gear mechanism at the lower end of the steering column 14, and the outer member consists of the plates 15—15 formed for convenience from sheet metal and secured face to face by the rivets 16 with V-shaped depressed portions 17 surrounding the radial projections 11. Between the depressed portion 17 and the projections 11 is interposed the elastic deformable material 18 which in this case is in the nature of a bushing or sleeve fitted over the projection 11. The plates 15—15 are provided with dependent portions affording the arm or leg 19 which carries the pin or bolt 20 in its lower end, which pin has a spherical head 21 for engagement in a socket on the end of a drag link 22 connected with steering linkage for the front wheels to guide the same under control of the automobile driver through the steering wheel on the upper end of the column 14. In the use of the invention as thus described, the elastic material cushions road shocks, reduces wheel wobble or shimmy, and frees the driver's hands from fatiguing strains incident to guiding the vehicle over the roadway.

The invention obviously may be used in various places where motion is to be transmitted from one part to another, and it will also be understood that although the invention has been described more or less specifically it is not limited to the exact details shown. Various modifications may be made as will be apparent to those skilled in the art.

I claim:

1. In a driven element of a clutch, a disc having frictional driving surfaces at its periphery and a central opening, a pair of plates secured on opposite sides of the disc adjacent said central opening and provided with a series of corelated offset portions providing cups that are closed at outer ends, a hub positioned within said opening in sliding contact with the inner ends of said plates to close the inner ends of the cups and provided with lugs that extend into said cups, and a pair of continuous rings of elastic deformable material interposed between opposite sides of the lugs and said plates and completely incased within said cups.

2. In a driven element of a clutch, a disc having frictional driving surfaces at its periphery and a central opening, a pair of plates secured on opposite sides of the disc adjacent said central opening and provided with a series of corelated offset portions providing cups that are closed at outer ends, a hub positioned within said opening in sliding contact with the inner ends of said plates to close the inner ends of the cups and provided with lugs that extend into said cups, and elastic deformable material inserted in said cups and completely filling the space between the said cups and lugs.

3. In a driven element of a clutch, a disc having frictional driving surfaces at its periphery and a central opening, a pair of plates secured on opposite sides of the disc adjacent the central opening and provided with a series of corelated offset portions providing cups, a hub positioned within said opening and provided with lugs that extend into said cups, and a pair of continuous rings of elastic material on opposite sides of the lugs and incased within said cups.

In testimony whereof I affix my signature.

AXEL J. JANSSON.